(12) United States Patent
Mackie (10) Patent No.: US 6,178,276 B1
(45) Date of Patent: Jan. 23, 2001

(54) END-PUMPED WAVEGUIDE OPTICAL SPLITTER-AMPLIFIERS BASED ON SELF-IMAGING

(75) Inventor: David M. Mackie, College Park, MD (US)

(73) Assignee: United States of America as represented by the Secretary of the Army, Washington, DC (US)

( * ) Notice: Under 35 U.S.C. 154(b), the term of this patent shall be extended for 0 days.

(21) Appl. No.: 09/288,083

(22) Filed: Apr. 5, 1999

(51) Int. Cl.[7] ............................... C02B 6/42; C02B 6/28; H04J 14/00; H01S 3/00
(52) U.S. Cl. ............................... 385/28; 385/24; 385/50; 385/39; 385/129; 359/109; 359/341
(58) Field of Search .................. 385/28, 24, 50, 385/39, 129; 359/109, 115, 341

(56) References Cited

U.S. PATENT DOCUMENTS

| 5,115,338 | * | 5/1992 | DiGiovanni et al. ................ 359/337 |
| 5,410,625 | | 4/1995 | Jenkins et al. . |
| 5,428,698 | | 6/1995 | Jenkins et al. . |
| 5,475,776 | | 12/1995 | Jenkins et al. . |
| 5,504,610 | * | 4/1996 | Bullow ................................ 359/173 |
| 5,530,584 | * | 6/1996 | Myslinkski et al. ................. 359/341 |
| 5,640,474 | | 6/1997 | Tayag . |
| 5,838,842 | | 11/1998 | Mackie . |
| 5,852,691 | | 12/1998 | Mackie . |
| 5,862,288 | | 1/1999 | Tayag et al. . |

* cited by examiner

*Primary Examiner*—Jon Henry
(74) *Attorney, Agent, or Firm*—Paul S. Clohan, Jr.

(57) ABSTRACT

The invention discloses devices and methods of manufacturing devices for the splitting and amplification of light signals by use of an end-pumped waveguide optical device, based on either (a) self-imaging multiplexing of the signal and pump light, then amplification of the signal, then simultaneous self-imaging splitting of the signal and demultiplexing of the signal and pump, then separation of the signal outputs via nonamplifying S-bends; or (b) self-imaging multiplexing of the signal and pump light, then amplification of the signal, then splitting of both signal and pump, then separation of the outputs via amplifying S-bends, and then finally self-imaging demultiplexing of the signal and pump light in each output.

10 Claims, 6 Drawing Sheets

END-PUMPED WAVEGUIDE OPTICAL SPLITTER-AMPLIFIERS BASED ON SELF-IMAGING

BACKGROUND OF THE INVENTION

A. Field of the Invention

This invention relates generally to integrated optics and photonics and more particularly to waveguides for performing splitting and amplification of light signals and to methods for making such waveguides.

Applications for optically pumped waveguide splitter/amplifiers include, but are not limited to, integrated optical architectures for signal processing, VLSI intraconnects and interconnects, fiber optic communications systems, antenna remoting, cable television, waveguide sensing, and control of phased array antennae.

B. Description of Related Art

Diffraction gratings illuminated with a highly spatially coherent plane wave produce "self-images" in certain planes behind the grating. The lens-like imaging produced solely by free-space propagation of a diffracted field is known as the Talbot effect. W. H. F. Talbot, "Facts relating to optical science, No. IV," Philos. Mag. 9, 401–407 (1836). Typical applications of the Talbot effect include optical image processing, optical testing, and production of optical elements. An overview of the operation of waveguide self-imaging devices is found in L. B. Soldano and E. C. M. Pennings, "Optical Multi-Mode Interference Devices Based on Self-Imaging: Principles and Applications," *J. of Lightwave Technology* 13, 615–627 (April 1995).

The use of the self-imaging effect in waveguides to perform 1 to N way beamsplitting is known, as exemplified by U.S. Pat. No. 5,475,776 to Jenkins et al., "Optical Mixing Device;" U.S. Pat. No. 5,410,625 to Jenkins et al., "Optical Device for Beam Splitting and Recombining;" U.S. Pat. No. 5,428,698 to Jenkins et al., "Signal Routing Device;" and U.S. Pat. No. 5,640,474 to Tayag, "Easily Manufacturable Optical Self-Imaging Waveguide."

U.S. Pat. Nos. 5,838,842 and 5,852,691 to Mackie, issued on Nov. 17, 1998 ("'842 patent") and Dec. 22, 1998 ("'691 patent"), respectively, provide additional background on self-imaging multimode interference devices and are incorporated by reference herein as if fully set forth. The '842 and '691 patents discuss techniques for the separation of orthogonally polarized light or that of 2 arbitrary wavelengths by use of a waveguide optical device, based on 1) simultaneous crossed and barred 1-by-1 off-center self-imaging, 2) out-of-phase self-imaging, and 3) simultaneous 1-by-1 and 1-by-2 self-imaging. Simultaneous crossed and barred 1-by-1 off-center self-imaging utilizes a waveguide optical polarization splitter having an input waveguide containing TE and TM, a multimode interference device, aligned so that TE and TM refractive indices are very different, and with the length set so that the polarization with the lower refractive index is bar self-imaged while the other polarization is cross self-imaged, an output waveguide containing polarization with higher refractive index, and another output waveguide containing the other polarization. Out-of-phase self-imaging utilizes a waveguide optical polarization splitter having an input waveguide containing TE and TM, a 1-by-2 polarization-independent self-imaging power splitter, an intermediate waveguide of length $L_{par}$ containing TE and TM, an intermediate waveguide of length $L_{par}+2*L_{perp}$ containing TE and TM, a 2-by-2 self-imaging coupler, output waveguide containing TE only, and an output waveguide containing TM only. The techniques of the '842 and '691 patents may also be used to separate light of 2 arbitrary wavelengths.

U.S. Pat. No. 5,862,288 issued on Jan. 19, 1999 to Tayag et al., incorporated by reference as if fully set forth, describes various techniques for implementing wavelength division (de)multiplexing operations using self-imaging waveguide devices. The techniques of Tayag and Batchman are similar to the techniques described in the '842 and '691 patents; however, the '842 and '691 patents discuss general wavelength splitting (e.g., the commonly used fiber-optic communication wavelength of 1.55 microns and a pump at 980 nm), not simply splitting of first and second harmonics.

There are presently two major approaches to making optical splitter/amplifiers: electrical pumping and optical pumping. Electrical pumping has the great potential advantages of simplicity and efficiency since no pump light source is needed. However, it is so extremely noisy as to render it useless for most applications. Research continues, but the problem may be intrinsic to the approach. Optical pumping, on the other hand, is well-established and in widespread commercial use in the form of erbium-doped fiber amplifiers (EDFAs). However, the EDFA is actually only one part of an optical splitter/amplifier. The pump and signal must both be introduced into the EDFA, which requires a multiplexer. Generally, a fused-fiber coupler is used. After the EDFA, the remaining pump light must be removed with a demultiplexer. Since the pump is still orders of magnitude more intense than the signal, the demultiplexer must be very efficient; a simple filter won't work. Generally, a fiber grating or bulk spectrometer is used. Lastly, the amplified signal is split, using either another fused-fiber coupler (a different type) or a waveguide splitter.

Further information and additional references on currently available splitter/amplifiers may be obtained from the patent applications and publications cited above. In summary, electrical pumping techniques are inadequate for most applications due to poor signal-to-noise ratio, and currently available optical pumping techniques use numerous components, some or all of which are bulk or fiber.

OBJECTS AND SUMMARY OF THE INVENTION

Therefore, it is an object of the invention to provide an efficient, optically pumped splitter/amplifier that is simple to build and requires a minimum of components. Other objects of the present invention include providing an optically pumped splitter/amplifier that is (a) consolidated into one small device and capable of performing multiplexing ("mux"), amplification, splitting, and demultiplexing ("demux"); (b) integrated so as to be small, rugged, require a minimum of external connections, and be environmentally insensitive; (c) easily manufacturable in a one step, mass-production process to reasonable tolerances; (d) efficient and economical with a high signal-to-noise ratio (SNR); (e) upgrade-friendly and compatible with polarization and wavelength signal multiplexing; (f) generally implementable in a variety of materials using a variety of fabrication processes. These and other objects are achieved, at least in part, by a self-imaging waveguide for splitting and amplification of a light signal which includes a first S-bend waveguide containing pump light of a first wavelength; a short waveguide containing signal light of a second wavelength; a first multimode interference device having an input end and an output end, the input end coupled to the first S-bend waveguide and the short waveguide, with the first multimode interference device configured so that one of the first or second wavelengths is bar self-imaged while the other wavelength is cross self-imaged; a long waveguide having an input end and an output end, in which the signal light is amplified, the input end of the long waveguide being coupled to the output end of the first multimode interference device; a second multimode interference device having an input end and an output end, the input end coupled to the output end of the long waveguide, with the second multimode interference device configured so that signal light at the second wavelength is doubly self-imaged while pump light at the first wavelength is singly self-imaged; a second S-bend waveguide coupled to the output end of the second multimode interference device containing half the power of the amplified signal light; a third S-bend waveguide coupled to the output end of the second multimode interference device containing half the power of the amplified signal light; a short output waveguide coupled to the output end of the second multimode interference device for directing the pump signal.

In accordance with another aspect of the invention the apparatus includes a first S-bend waveguide for transmitting pump light of a first wavelength; a short waveguide for transmitting signal light of a second wavelength; a first multimode interference device having an input end and an output end, the input end coupled to the first S-bend waveguide and the short straight waveguide, with the first multimode interference device configured so that one of the first or second wavelengths is bar self-imaged while the other wavelength is cross self-imaged; a long waveguide having an input end and an output end, in which the signal light is amplified, the input end of the long waveguide being coupled to the output end of the first multimode interference device; a second multimode interference device having an input end and an output end, the input end coupled to the output end of the long waveguide, with the second multimode interference device configured so that light at both the first and second wavelengths is doubly self-imaged; a second S-bend waveguide having an input end and an output end, the input end of the second S-bend waveguide coupled to the output end of the second multimode interference device containing half the power of both the pump and the amplified signal light, in which amplification of the signal light continues; a third S-bend waveguide having an input end and an output end, the input end of the third S-bend waveguide coupled to the output end of the second multimode interference device containing half the power of both the pump and the amplified signal light, in which amplification of the signal light continues; a third multimode interference device having an input and an output, the input of the third multimode interference device coupled to the output of the third S-bend waveguide with the third multimode interference device configured so that one of the first or second wavelengths is bar self-imaged while the other wavelength is cross self-imaged; a fourth multimode interference device having an input end and an output end, the input end coupled to the output of the third S-bend input waveguide with the third multimode interference device configured so that one of the first or second S-bend waveguide having an input end and an output end, the input end of the fourth S-bend waveguide coupled to the output end of the third multimode interference device and containing the pump light only; a fifth S-bend waveguide having an input end and an output end, the input end of the fifth S-bend waveguide coupled to the output end of the fourth multimode interference device and containing the pump light only; a second short output waveguide coupled to the output end of the third multimode interference device containing half the power of the signal light, and a third short output waveguide coupled to the output end of the fourth multimode interference device containing half the power of the signal light.

In accordance with another aspect of the invention the apparatus includes a cascade of at least two self-imaging multiplexers to increase signal power and improve pump distribution using lower power pumps.

In accordance with another aspect of the invention, the apparatus includes a cascade of at least two self-imaging demultiplexers to improve the signal-to-noise ratio (SNR) and provide for signal splitting.

Still other objects of the present invention will become readily apparent to those skilled in the art from the following detailed description, wherein we have shown and described only preferred embodiments, simply by way of illustration of the best mode contemplated by us of carrying out the invention. As will be realized, the invention is capable of other and different embodiments, and its several details are capable of modifications in various obvious respects, all without departing from the invention. Accordingly, the drawings and description should be regarded as illustrative in nature, and not as restrictive.

DETAILED DESCRIPTION OF PREFERRED EMBODIMENTS

Figure 1:
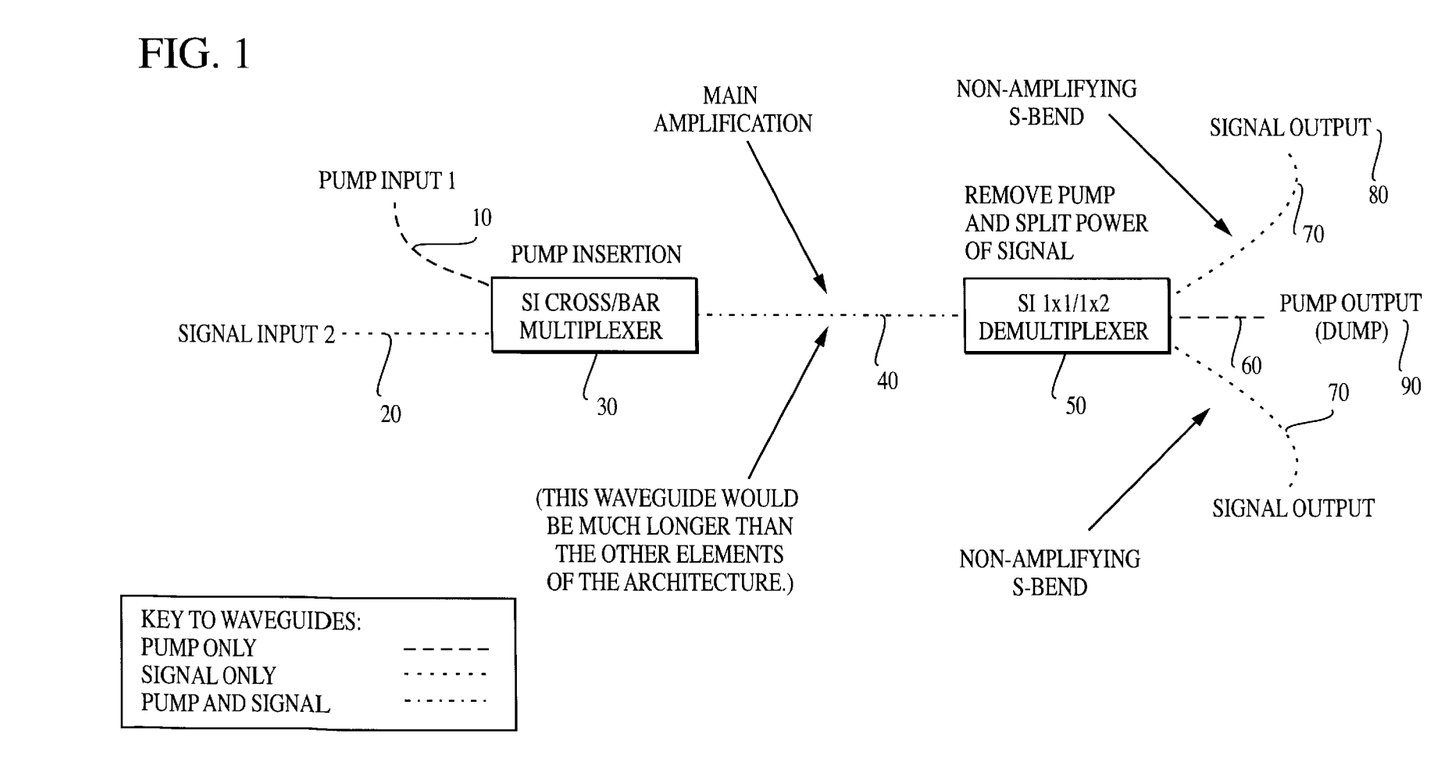
FIG. 1 shows a schematic top view of a first preferred method ("Method A") according to the invention of this application.

FIG. 1 shows a schematic top view of a first method of the claimed invention, referred to as "Method A." Input waveguide 10 which is generically referred to herein as an "S-bend" waveguide, contains pump light 1 (e.g, 980 nm). The term "S-bend waveguide" as used throughout this application means a waveguide that displaces the light in a lateral direction, i.e., a direction perpendicular to the general direction of propagation of light through the system, whether or not the waveguide is actually formed in the shape of an "S." Thus, the term "S-bend" includes turning mirrors, cosine bends, circular bends, etc., or any other waveguide that displaces light in a direction perpendicular to the general direction of propagation of light through the system. Short waveguide 20 contains signal light 2 (e.g., 1550 nm). Preferably, the short waveguides referred to throughout this application will be straight, short waveguides in order to minimize signal attenuation. However, the term "short waveguide" as used herein refers generally to a short waveguide which may or may not be straight since other design constraints may call for the short waveguide to be curved. Input waveguide 10 and short waveguide 20 will both terminate on roughly the same plane perpendicular to the direction of propagation of light and will be coupled to the input end 28 of multimode interference device 30. Multimode interference device 30 is a cross/bar self-imaging multiplexer (see the '842 and '691 patents for details), and sized in length (i.e., in the direction of propagation of light) so that one wavelength is bar self-imaged while the other wavelength is cross self-imaged. Long waveguide 40 (on the order of 2 cm) contains both the signal and pump light, in which the signal light is amplified. Long waveguide 40 is an amplifier and functions in a manner familiar to those of ordinary skill in the art. Generally, long waveguide 40 is doped with erbium (Er) and/or ytterbium (Yb), but this type of doping is not required. Other pump/signal wavelengths may require different dopants, as would be familiar to one of skill in the art. While long waveguide 40 is shown as a straight line, it may be, and typically is looped or spiraled as design constraints require. Following signal amplification, the pump light must be separated from the signal light. Multimode interference device 50 serves this function. Multimode interference device 50 is a self-imaging 1×1/1×2 demultiplexer (see the '842 patent for details), sized in length (i.e., the direction of signal propagation) so that light at the pump wavelength is singly self-imaged while light at the signal wavelength is doubly self-imaged. Output waveguide 60 contains the pump light only. Two S-bend output waveguides 70 each contain approximately half the power of the amplified signal light only. Method A as shown in FIG. 1 thus provides self-imaging multiplexing of the signal and pump light at 30, then amplification of the signal at 40, then simultaneous self-imaging splitting of the signal and demultiplexing of the signal and pump at 50, then lateral separation of the signal outputs via nonamplifying S-bends 70. The pump light 1 is introduced, either via fiber or from another waveguide device, at a convenient lateral distance from the signal input 2. For fiber inputs, the original separation would be on the order of 250 microns. S-bend 10 is used to bring the pump and signal waveguides close together. The final distance would vary depending on the materials, fabrication, etc., but would be on the order of 10 microns. Signal input 2 is a waveguide designed to minimize absorption of the original signal due to passage through a doped but unpumped waveguide. (Uniform doping is assumed in the examples discussed in this application but it is not required for the patent. Selective area doping would improve the performance of all devices, but at the cost of additional fabrication complexity.) The input and output waveguides may be tapered in order to allow good overlap with fibers at one end while being narrower at the other end to allow closer packing.

Both the pump and signal light are fed into a self-imaging multiplexer 30, which combines them into a single output 40. The length of 30 would depend upon many factors including the wavelengths, the width, the materials, the fabrication, and the desired performance. The design of 30 is discussed in the '691 patent application. Generally, one would keep 30 as short as possible, since the pump will work more efficiently in 40. Designs for 30 using 980 nm pump light and 1540 nm signal light in Er-doped soda-lime silicate glass waveguides deposited on a pedestal etched silica substrate give excellent performance. For example, computer model calculations show that a self-imaging multiplexer 4 microns wide and 200 microns long gives a 90% throughput for both wavelengths. It should be noted that, for the sake of consistency, the examples in this application will all pertain to those wavelengths, (i.e., 980 nm pump light and 1540 nm signal light) and to this material system and fabrication method. However, the ideas may be applied to other material systems, such as lithium niobate, sol-gels, or polymers, to other fabrication methods, and to other pump and signal wavelengths. Of course, as would be apparent to one of ordinary skill in the art, design parameters would vary considerably, and achievable performance would need to be determined separately for each case. See the '842 and '691 patents for examples in lithium niobate and gallium arsenide.

With optically pumped systems, greater signal amplification has typically been obtained by increasing the pump light power. Beyond a certain point, however, an increase in pump light power will result in undesirable nonlinearities ("overpumping"). Also, the cost of the pump increases sharply at higher pump powers. Accordingly, where higher pump power is desired, a cascade of multiplexers may be advantageous to inject pump light in stages at lower power levels. FIG. 3 shows a cascade of three multiplexers 331, 332, and 333. Pump light $P_1$ and signal S are introduced at the input end of mux 331. The output of 331, $S+P_1$, is fed via waveguide 401 (where S is amplified) to mux 332. Pump light $P_2$ is introduced at the input end of mux 332. Mux 332 dumps pump light $P_1$ at its output (designated $P_1^-$ in FIG. 3). The other output of 332, $S^++P2$, is fed via waveguide 402 (where $S^+$ is further amplified) to mux 333 where pump light $P_3$ is introduced. Mux 333 dumps pump light $P_2$ at its output (designated $P_2^-$ in FIG. 3) and the signal $S^++P_3$ are fed via a waveguide (not shown in FIG. 3) such as 40 in FIG. 1 or 140 in FIG. 2 to the rest of the system. Virtually any number of multiplexers may be similarly arranged in cascade, depending on design requirements.

Figure 4:
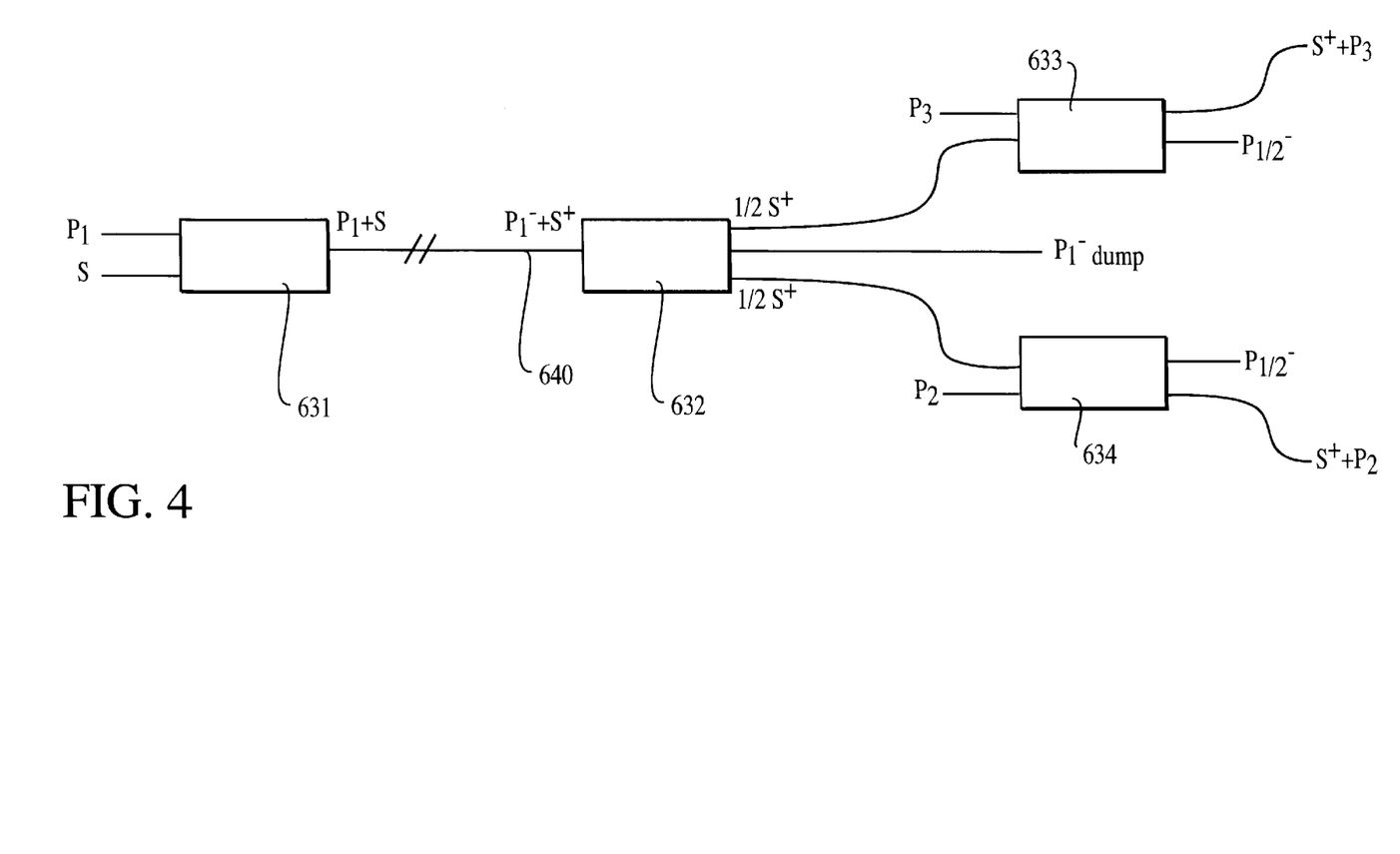
FIG. 4 shows a shematic top view of an alternative configuration of cascading multiplexers.

FIG. 4 shows an alternative arrangement for cascading multiplexers for signal amplification and splitting. Pump light $P_1$ and signal S are introduced at the input end of mux 631. The output of 631, $S+P_1$ is fed via waveguide 640 to mux 632. Split signals 1/2 $S^+$ and 1/2 $S^+$ emerge at the output of 632 and $P_1^-$ gets dumped. Split signals 1/2 $S^+$ are each fed to the inputs of muxes 633 and 634. Pump $P_2$ is introduced at the input end of 634 and pump $P_3$ is introduced at the input end of mux 633. The output end of muxes 633 and 634 each provide 1/2 $S^++P_3$ and 1/2 $P_1^-$. Again, virtually any number of multiplexers may be similarly arranged in cascade, depending on design requirements.

Although some signal amplification would occur in 30 (or the cascade of muxes 331, 332 and 333) the primary amplification would occur in 40 or in the cascade of waveguides 401 and 402, etc., if a cascade of muxes is included. The length of 40 would vary depending upon pump power, desired signal amplification, dopant cross-section and lifetime, etc., but would be on the order of several centimeters. At the end of 40, both wavelengths are fed into a self-imaging demultiplexer/splitter device 50, which simultaneously removes the pump light and splits the amplified signal light into two outputs, with the same power in each output. Several designs for 50 for the example system described above gave excellent performance. The best design for which careful calculations have been made is 20 microns wide by 573 microns long, has a 96% signal throughput (48% in each signal output) and a 1% pump crosstalk in each signal output. Crosstalk, in this case, refers to pump light remaining mixed with the signal light. The design can be varied to reduce crosstalk further, but at a cost in signal throughput. A better solution, however, is cascading, which is described more fully, below.

The pump light enters a waveguide 60 leading to a dump (or perhaps a monitoring sensor), while the signal light is laterally separated with two S-bend waveguides 70. For fiber outputs, the final separation would be on the order of 250 microns. Some signal loss would occur in 70 due to passage through a doped but unpumped waveguide. However, the distance is not very long and the loss would occur in an amplified signal. One would compensate by increasing the pump power and/or the length of 40.

Figure 2:
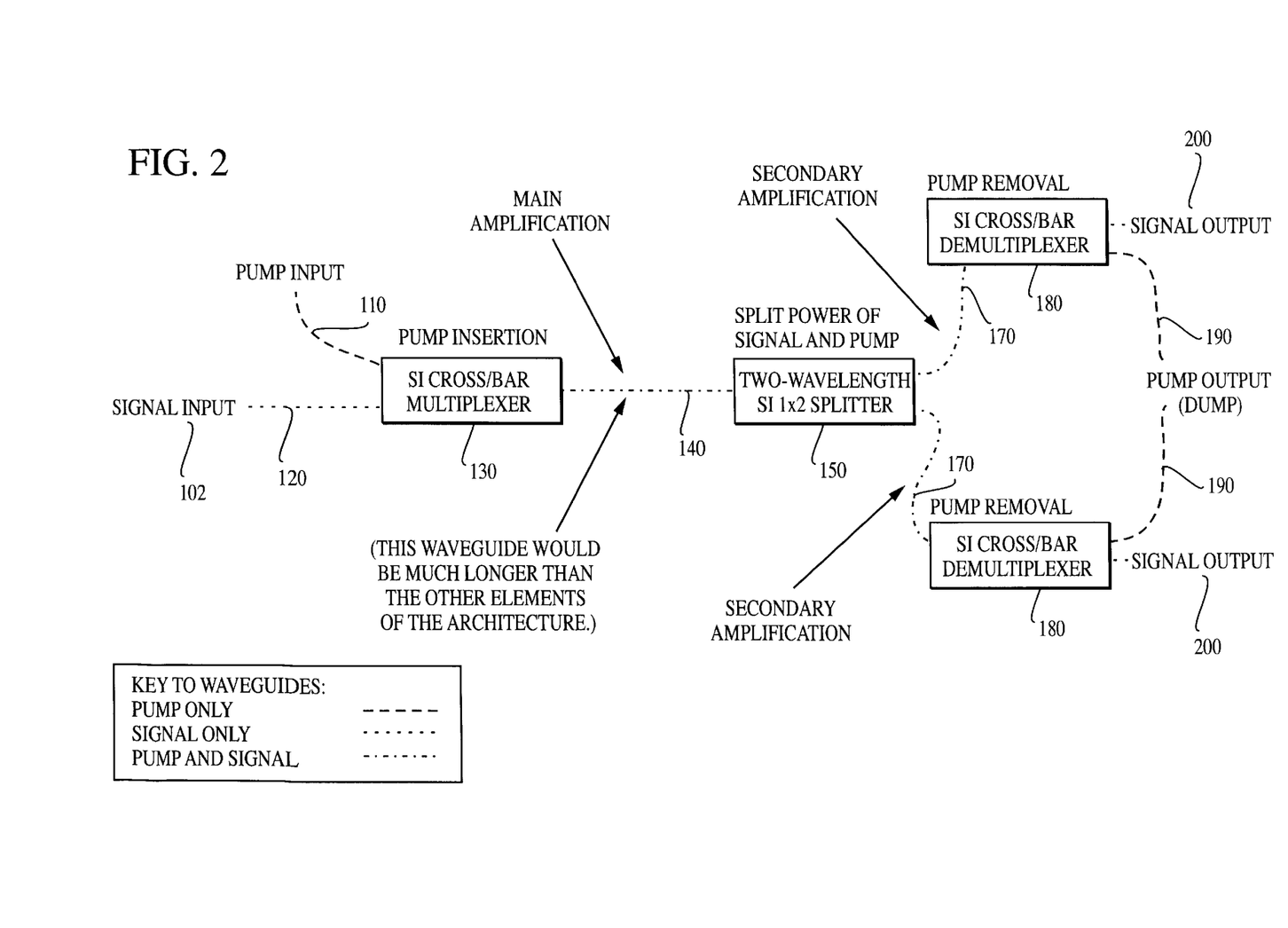
FIG. 2 shows a schematic top view of a second preferred method ("Method B") according to the invention of this application.
Figure 3:
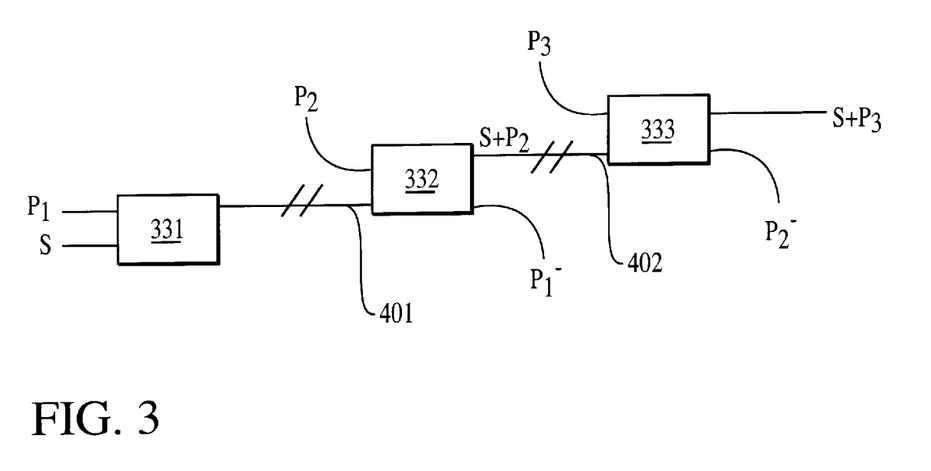
FIG. 3 shows a schematic top view of a cascade of multiplexers to increase signal power using a series of lower power pumps.

FIG. 2 shows a schematic top view of a second method of the invention disclosed herein, referred to as "Method B." Method B depicts self-imaging multiplexing of the signal and pump light, then amplification of the signal, then splitting of both signal and pump, then lateral separation of the outputs via amplifying S-bends, and then finally self-imaging demultiplexing of the signal and pump light in each output. Referring to FIG. 2, components 102, 110, 120, 130 and 140 are the same as 2, 10, 20, 30 and 40, respectively in FIG. 1. At the end of 40, both wavelengths are fed into a 1×2 power splitter 150. 1×2 power splitter 150 may be a self-imaging device, as is shown in FIG. 2, or alternatively it could be a conventional y-branch splitter. The light in a self-imaging device may require multiple self-imagings for each wavelength before the length is such as to give good 1×2 splitting for both wavelengths because one is splitting two wavelengths simultaneously. Thus, a 2-wavelength y-branch power splitter might be significantly shorter for the same performance. Also, y-branch power splitters could be more narrow, which would keep the pumping efficiency high. On the other hand, y-branch splitters require submicron feature sizes for good performance, which can present a fabrication problem. This is especially true if polarization cross-talk is an issue. For the example of FIG. 1 above, a self-imaging 2-wavelength power splitter which is 9 microns wide by 426 microns long would have 80% throughput for both signal and pump. Note that no effort was made in the calculations to optimize the performance of this particular component, since for the example case a y-branch splitter would offer better system performance.

The outputs of 150 are fed into S-bends 170, which provide the desired final lateral separation of the amplified signal outputs. As in Method A, S-bends 170 would vary in length depending upon the application, but for fiber outputs the final separation would be about 250 microns. Notice that, in contrast to Method A, these S-bends are being pumped, so that no signal loss occurs in 170. This makes more efficient use of the pump light, thus reducing power requirements. At the end of 170, the signal and pump light are fed into self-imaging demultiplexers 180. The demultiplexers are reversed versions of 30, discussed above under Method A. For demultiplexers, the important parameters are the throughput of the signal (which should be high) and the crosstalk of the pump (which should be low). Calculations for the example device described above indicate 90% throughput for the 1540 nm signal light and 2% crosstalk for the 980 nm pump light. By lowering the throughput to 57%, the crosstalk can be reduced to only 0.025%. Below we discuss a multi-step method for reducing crosstalk with less cost in throughput. The pump light is fed into S-bend waveguides 190 and dumped. The signal light is fed into short straight waveguides 200, which are very short and so cause negligible signal absorption.

Figure 5:
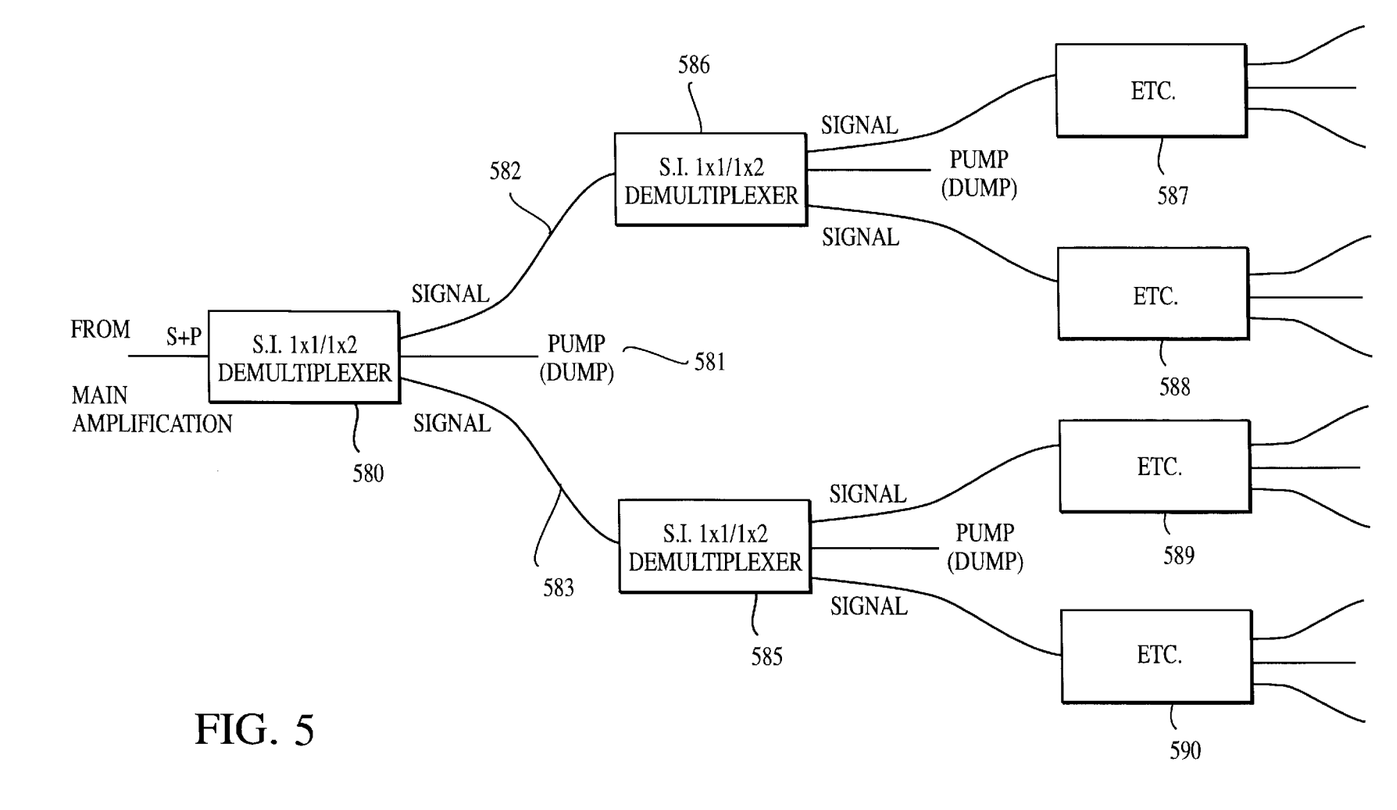
FIG. 5 shows a schematic top view of cascading of demultiplexers to increase SNR under Method A.

If the demultiplexers of Methods A and B do not provide sufficient removal of the pump light, the signal-to-noise ratio (SNR) of the signal will be degraded. A solution to the SNR problem in either case is to cascade demultiplexers. This is shown in FIG. 5 for the demultiplexer of Method A, and in FIG. 6 for the demultiplexers of Method B. It is fairly self-explanatory, however, several additional points should be made. Referring to FIG. 5, S+P is input to demux 580 from the main amplification waveguide such as 40 in FIG. 1. For the sake of illustration, assume that the demux devices have a 10% crosstalk and near-perfect signal throughput. Demux 580 splits the signal into two signals of, roughly, 1/2 S+1/10 P, each. The split signals are fed via S-bend waveguides 582 and 583 to demuxes 585 and 586. Demuxes 585 and 586 each split their respective inputs into two resulting in 4 signal outputs at this stage of 1/4 S+1/100 P. These signals may each be input to demuxes 587, 588, 589 and 590 and each split in the same manner resulting in 8 signal outputs of 1/8 S and 1/1000 P. The splitting and demuxing may be continued until the desired fanout has been obtained.

Figure 6:
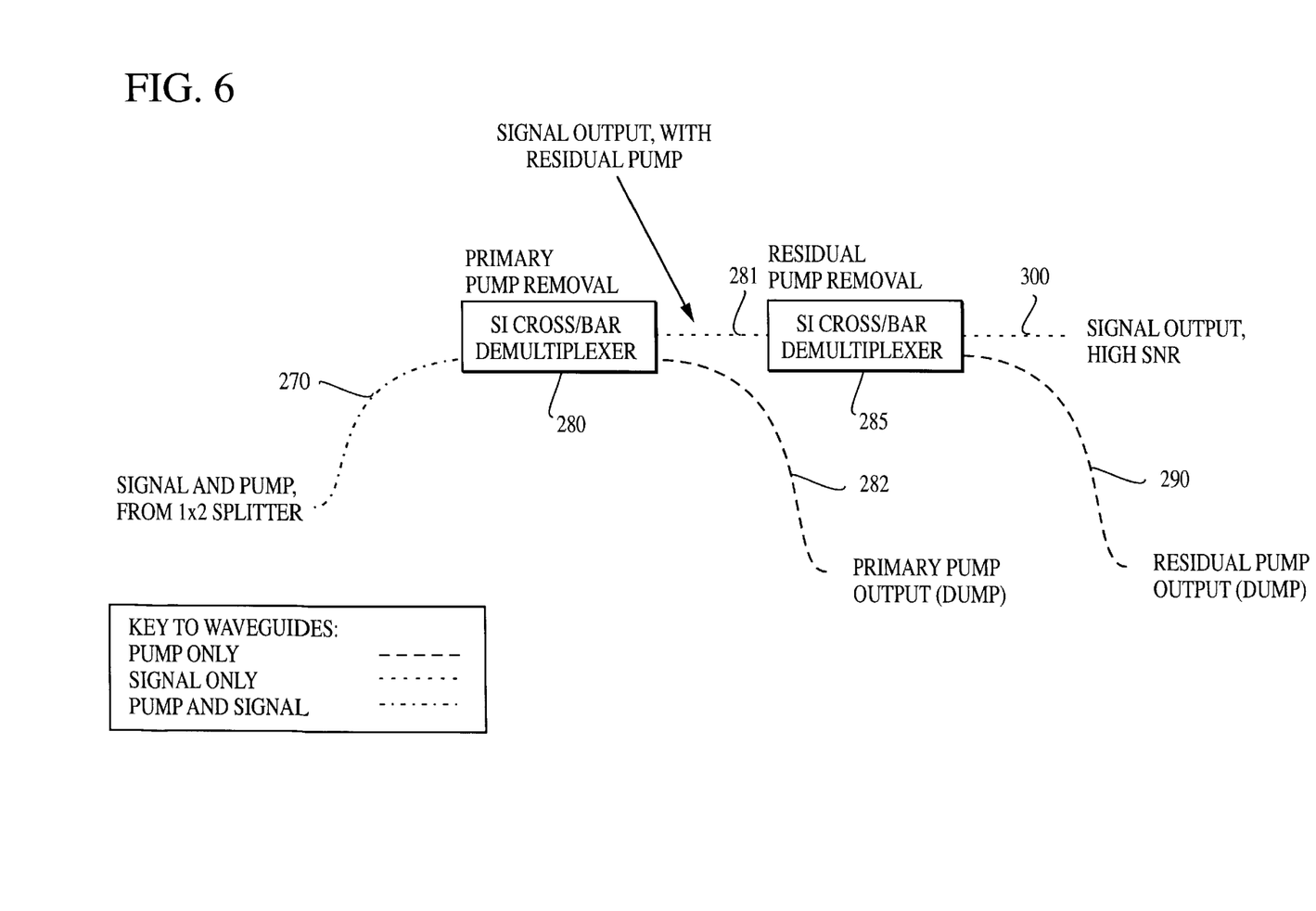
FIG. 6 shows a schematic top view of cascading of demultiplexers to increase SNR under Method B.

With reference to FIG. 6, the intermediate signal output waveguide 281 can be quite small but should not be zero. It serves as an additional filter of pump light which has not been imaged into the pump output 282. Second, in general, self-imaging demultiplexers will work better as they are made wider, but this can lead to impractically long devices if the SNR requirements are stringent. Since only the signal light matters in this application (as opposed to demultiplexing two signals at 1310 nm and 1550 nm, for example), cascaded narrow self-imaging demultiplexers will be the better choice for most cases. They can provide extremely high SNR in a short length. Third, one is not limited to cascading only two demulfiplexers, especially if each one is short. Fourth, the performance of the multiplexer (30 and 130, respectively, in Methods A and B) is not as critical as the performance of the demultiplexer. If the multiplexer has 99% efficiency, that would be much better than needed. However, if the demultiplexer allows 1% crossover, and the pump light is 100 times more intense than the signal (a reasonable number), than the SNR would be 1 which is completely unacceptable. (Most applications require a value of 0.01 or less for the SNR). Thus, cascading multiplexers may be of great practical importance. For example, with respect to the Er glass-on-glass device discussed above in Method B, throughput was 90% and cross-talk was 2%. One cascade gives 81% throughput (90% of 90%) and 0.04% cross-talk (2% of 2%). Two cascades still transmits 73% of the signal light while allowing only 6 parts per million of the pump light, and the length is only about 600 microns. Lastly, one often wants more than two-fold splitting of the amplified signal. Method A is ideally suited to this, since it uses a splitter/demultiplexer. Each cascading not only doubles the splitting, but increases the SNR. Cascading 3 splitter/demultiplexers of the example case would give 1×8 splitting with a throughput of 88% and an incredibly small crosstalk of only one part per million, in a length of only 1.7 mm (plus the S-bend distance).

Note that Methods A and B make use of self-imaging devices described in the '842 patent, where they are referred to as Method A and Method B. Also, Method B in this application makes optional use of a two-wavelength self-imaging splitter which is based on the same principles as Methods A and B of the '842 and '691 patents. However, the '842 and '691 patents also describe an out-of-phase self-imaging device, which they refer to as Method C. Note that variations of Method C of the '842 patent may optionally be used for any of the self-imaging devices of this invention disclosure, in particular for non-isotropic material systems.

It will be readily seen by one of ordinary skill in the art that the present invention fulfills all of the objects set forth above. After reading the foregoing specification, one of ordinary skill will be able to effect various changes, substitutions of equivalents and various other aspects of the present invention as broadly disclosed herein. It is therefore intended that the protection granted hereon be limited only by the definition contained in the appended claims and equivalents thereof.

Having thus shown and described what is at present considered to be preferred embodiments of the present invention, it should be noted that the same have been made by way of illustration and not limitation. Accordingly, all modifications, alterations and changes coming within the spirit and scope of the present invention are herein meant to be included.

I claim:

1. A self-imaging waveguide for splitting and amplification of a light signal, comprising:
    (a) a first S-bend waveguide for transmitting pump light of a first wavelength;
    (b) a first short waveguide for transmitting signal light of a second wavelength;
    (c) a first multimode interference device having an input end and an output end, the input end coupled to the first S-bend waveguide and the straight waveguide, with the first multimode interference device configured so that one of the first or second wavelengths is bar self-imaged while the other wavelength is cross self-imaged;
    (d) a long waveguide having an input end and an output end, in which the signal light is amplified, the input end of the long waveguide being coupled to the output end of the first multimode interference device;
    (e) a second multimode interference device having an input end and an output end, the input end coupled to the output end of the long waveguide, with the second multimode interference device configured so that light at the second wavelength is doubly self-imaged, while light at the first wavelength is singly-self imaged;
    (f) a third S-bend waveguide coupled to the output end of the second multimode interference device for transmitting half the power of the amplified signal light;
    (g) a second S-bend waveguide coupled to the output end of the second multimode interference device for transmitting half the power of the amplified signal light; and
    (h) a second short waveguide coupled to the output end of the second multimode interference device for directing the pump light.

2. A self-imaging waveguide for splitting and amplification of a light signal, comprising:
    (a) a first S-bend input waveguide for transmitting pump light of a first wavelength;
    (b) a first short waveguide for transmitting signal light of a second wavelength;
    (c) a first multimode interference device having an input end and an output end, the input end coupled to the first S-bend waveguide and the short waveguide, with the first multimode interference device configured so that one of the first or second wavelengths is bar self-imaged while the other wavelength is cross self-imaged;
    (d) a long waveguide having an input end and an output end, in which the signal light is amplified, the input end of the long waveguide being coupled to the output end of the first multimode interference device;
    (e) a second multimode interference device having an input end and an output end, the input end coupled to the output end of the long waveguide, with the second multimode interference device configured so that light at both the first and second wavelengths is doubly self-imaged;
    (f) a second S-bend waveguide having an input end and an output end, the input end of the second S-bend waveguide coupled to the output end of the second multimode interference device containing half the power of both the pump and the amplified signal light, in which amplification of the signal light continues;
    (g) a third S-bend waveguide having an input end and an output end, the input end of the third S-bend waveguide coupled to the output end of the second multimode interference device containing half the power of both the pump and the amplified signal light, in which amplification of the signal light continues;
    (h) a third multimode interference device having an input end and an output end, the input end of the third multimode interference device coupled to the output of the second S-bend waveguide with the third multimode interference device configured so that one of the first or second wavelengths is bar self-imaged while the other wavelength is cross self-imaged;
    (i) a fourth multimode interference device having an input end and an output end, the input end coupled to the output of the third S-bend waveguide with the fourth multimode interference device configured so that one of the first or second wavelengths is bar self-imaged while the other wavelength is cross self-imaged;
    (j) a fourth S-bend waveguide having an input end and an output end, the input end of the fourth S-bend waveguide coupled to the output end of the third multimode interference device for transmitting the pump light;
    (k) a fifth S-bend waveguide having an input end and an output end, the input end of the fifth S-bend waveguide coupled to the output end of the fourth multimode interference device for transmitting the pump light; and
    (l) a second short waveguide coupled to the output end of the third multimode interference device for transmitting half the power of the signal light; and
    (l) a third short waveguide coupled to the output end of the fourth multimode interference device for transmitting half the power of the signal light.

3. The self-imaging waveguide of claim 1 further comprising a cascade of multimode interference devices functioning as multiplexers, each stage of the cascade introducing pump light to improve pump distribution and permit the use of lower power pumps.

4. The self-imaging waveguide of claim 1 further comprising a cascade of multimode interference devices functioning as demultiplexers to improve signal to noise ratio and provide for additional signal splitting.

5. The self-imaging waveguide of claim 3 wherein the second multimode interference device is replaced by a cascade of at least two multimode interference devices to improve signal to noise ratio.

6. A method of manufacturing a self-imaging waveguide for splitting and amplification of a light signal, comprising:
    (a) providing a first S-bend input waveguide for transmitting pump light of a first wavelength;
    (b) providing a first short waveguide for transmitting signal light of a second wavelength;
    (c) providing a first multimode interference device having an input end and an output end;
    (d) coupling the input end first of the first multimode interference device to the first S-bend input waveguide and to the first short waveguide;
    (e) configuring the first multimode interference device so that one of the first or second wavelengths is bar self-imaged while the other wavelength is cross self-imaged;

(f) providing a long waveguide having an input end and an output end, in which the signal light is amplified;

(g) coupling the input end of the long waveguide to the output end of the first multimode interference device;

(h) providing a second multimode interference device having an input end and an output end;

(i) coupling the input end of the second multimode interference device to the output end of the long waveguide;

(j) configuring the second multimode interference device so that light at both the first and second wavelengths is doubly self-imaged;

(k) providing a second S-bend waveguide;

(l) coupling the second S-bend waveguide to the output end of the second multimode interference device for transmitting half the power of both the pump and the amplified signal light, in which amplification of the signal light continues;

(m) providing a third S-bend waveguide;

(n) coupling the third S-bend waveguide to the output end of the second multimode interference device for transmitting half the power of both the pump and the amplified signal light, in which amplification of the signal light continues;

(m) providing a second short waveguide for directing the pump signal; and (n) coupling the second short waveguide to the output end of the second multimode interference device.

7. A method of manufacturing a self-imaging waveguide for splitting and amplification of a light signal, comprising:

(a) providing a first S-bend input waveguide for transmitting pump light of a first wavelength;

(b) providing a first short waveguide for transmitting signal light of a second wavelength;

(c) providing a first multimode interference device having an input end and an output end;

(d) coupling the input end of the first multimode interference device to the first S-bend input waveguide and the first short waveguide;

(e) configuring the first multimode interference device so that one of the first or second wavelengths is bar self-imaged while the other wavelength is cross self-imaged;

(d) providing a long waveguide having an input end and an output end, in which the signal light is amplified;

(e) coupling the input end of the long waveguide to the output end of the first multimode interference device;

(f) providing a second multimode interference device having an input end and an output end;

(g) coupling the input end of the second multimode interference device to the output end of the long waveguide;

(h) configuring the second multimode interference device so that light at both the first and second wavelengths is doubly self-imaged;

(i) providing a second S-bend waveguide having an input end and an output end for transmitting half the power of both the pump and the amplified signal light, in which amplification of the signal light continues;

(j) coupling the input end of the second S-bend waveguide to the output end of the second multimode interference device;

(k) providing a third S-bend waveguide having an input end and an output end for transmitting half the power of both the pump and the amplified signal light, in which amplification of the signal light continues;

(l) coupling the input end of the third S-bend waveguide coupled to the output end of the second multimode interference device;

(m) providing a third multimode interference device having an input and an output;

(n) coupling the input of the a third multimode interference device the output of the second S-bend waveguide;

(o) configuring the third multimode interference device so that one of the first or second wavelengths is bar self-imaged while the other wavelength is cross self-imaged;

(p) providing a fourth multimode interference device having an input end and an output end;

(q) coupling the input end of the fourth multimode interference device to the output of the third S-bend input waveguide;

(r) configuring the fourth multimode interference device so that one of the first or second wavelengths is bar self-imaged while the other wavelength is cross self-imaged;

(s) providing a fourth S-bend waveguide having an input end and an output end for transmitting the pump light;

(t) coupling the input end of the fourth S-bend waveguide to the output end of the third multimode interference device;

(u) providing a fifth S-bend waveguide having an input end and an output end for transmitting the pump light;

(v) coupling the input end of the fifth S-bend waveguide to the output end of the fourth multimode interference device;

(w) providing a second short waveguide for transmitting half the power of the signal light;

(x) coupling the second short waveguide to the output end of the third multimode interference device;

(y) providing a third short waveguide for transmitting half the power of the signal light; and (z) coupling the third short waveguide to the output end of the fourth multimode interference device.

8. A method of manufacturing a self-imaging waveguide for splitting and amplification of a light signal according to claim 6 further comprising providing a cascade of at least two stages of multimode interference devices each stage of the cascade introducing pump light to improve pump distribution and permit the use of lower power pumps.

9. A method of manufacturing a self-imaging waveguide for splitting and amplification of a light signal according to claim 6 further comprising providing a cascade of at least two multimode interference devices to improve signal to noise ratio.

10. A method of manufacturing a self-imaging waveguide for splitting and amplification of a light signal according to claim 7 further comprising providing a cascade of at least two multimode interference devices to improve signal to noise ratio.

* * * * *